(12) United States Patent
Lin (10) Patent No.: US 8,979,109 B2
(45) Date of Patent: Mar. 17, 2015

(54) SHOCK ABSORBERS FOR A BICYCLE

(71) Applicant: Wei-Ting Lin, Taichung (TW)

(72) Inventor: Wei-Ting Lin, Taichung (TW)

(*) Notice: Subject to any disclaimer, the term of this patent is extended or adjusted under 35 U.S.C. 154(b) by 145 days.

(21) Appl. No.: 13/684,486

(22) Filed: Nov. 23, 2012

(65) Prior Publication Data
US 2014/0145412 A1    May 29, 2014

(51) Int. Cl.
*B62K 25/14*    (2006.01)
*B62K 25/04*    (2006.01)

(52) U.S. Cl.
CPC ........... *B62K 25/04* (2013.01); *B62K 2025/041* (2013.01)
USPC ....................................................... 280/277

(58) Field of Classification Search
CPC ....... B62K 5/00; B62K 5/005; B62K 2201/06

USPC ........... 180/902; 267/158, 260, 270; 280/275, 280/276, 277, 283, 284, 285, 286
See application file for complete search history.

(56) References Cited

U.S. PATENT DOCUMENTS 1,588,900 A * 6/1926 McGrath ........................ 280/283
5,947,499 A * 9/1999 Busby ............................ 280/284

* cited by examiner

*Primary Examiner* — Joseph Rocca
*Assistant Examiner* — Felicia L Brittman
(74) *Attorney, Agent, or Firm* — Che-Yang Chen; Law Office of Michael Chen (57) ABSTRACT

Shock absorbers for a bicycle has at least a pair of front suspensions and at least a pair of rear suspensions. The shock absorbers have a light weight and simple structure. The vibration, which occurs on the front and rear wheels can be absorbed by compression or expending movement of the suspensions.

9 Claims, 7 Drawing Sheets

SHOCK ABSORBERS FOR A BICYCLE

BACKGROUND OF THE INVENTION

1. Field of the Invention

The present invention relates to shock absorbers for a bicycle, and more particularly to shock absorbers for a bicycle with a light weight and simple structure.

2. Description of the Related Art

Bicycling has become a very popular habit, which can provide transportation, exercise purpose and green fuel. Most of bicycles are equipped with shock absorbers for more comfort and safety.

Common shock absorbers for the bicycle are spring type and liquid damper type. However, both of these two types have large dimensions, heavy weight and complex structure, when these shock absorbers are mounted on the bicycle, which cause extra heavy weight to the bicycle. Furthermore, the shock absorbers are expensive and might ruin the appearance of the bicycle.

Therefore, it is desirable to provide shock absorbers for a bicycle to mitigate and/or obviate the aforementioned problems.

SUMMARY OF THE INVENTION

An objective of the present invention is to provide shock absorbers for a bicycle with a light weight and simple structure.

In order to achieve the above mentioned objective, shock absorbers for a bicycle has at least a pair of front suspensions and at least a pair of rear suspensions. A support frame of the bicycle has a front fork portion and a rear fork portion, an upper portion and a lower portion of the rear fork portion are respectively discontinuous, a first rear upper fork section and a second rear upper fork section are separated on the upper portion and a first rear lower fork section and the second rear lower fork section are separated on the lower portion, an assembling space is respectively formed between the separated first and second rear upper fork sections and the separated first and second rear lower fork sections and each assembling space is respectively provided with one rear suspension, such that the upper portion and the lower portion respectively form a supporting structure. The front suspension has a first solid damper having a columnar shape, the solid damper having a plurality of overlapped elastic sheets, each elastic sheet made of metal and having a bent portion at a middle section which provides elasticity; and one end of the solid damper has a front fork end and another end is provided with a first securing base. The rear suspension has a second solid damper having a columnar shape, the second solid damper having a first elastic sheet set and a second elastic sheet set; wherein the first and second elastic sheet sets respectively comprise a plurality of overlapped elastic sheets, each elastic sheet made of metal and having a bent portion at a middle section which provides elasticity; and wherein the first elastic sheet set and the second elastic sheet set are arranged adjacent to each other; and opposing ends of the second solid damper are respectively provided with a second securing base.

With above-mentioned structure, following benefits can be obtained: 1. The front suspension and the rear suspensions have relative smaller dimensions and compatible with typical support frames, which is a plus for the design outlook of the bicycle. 2. The front suspension and the rear suspensions have relative lighter weight, which overall provides minimum weight to the bicycle. 3. The front suspension and the rear suspensions have relative simpler structure, which makes maintenance and repair much easier and lower cost. 4. The front suspension and the rear suspensions require easy assembly; and by adjusting the number of the elastic sheets the damper can provide different elasticity. 5. The suspensions are directly mounted next to the front and rear wheels, therefore, the relative positions among the handles, seat, peddles and the support frame remain the same.

Other objects, advantages, and novel features of the invention will become more apparent from the following detailed description when taken in conjunction with the accompanying drawings.

DETAILED DESCRIPTION OF THE PREFERRED EMBODIMENT

Figure 5:
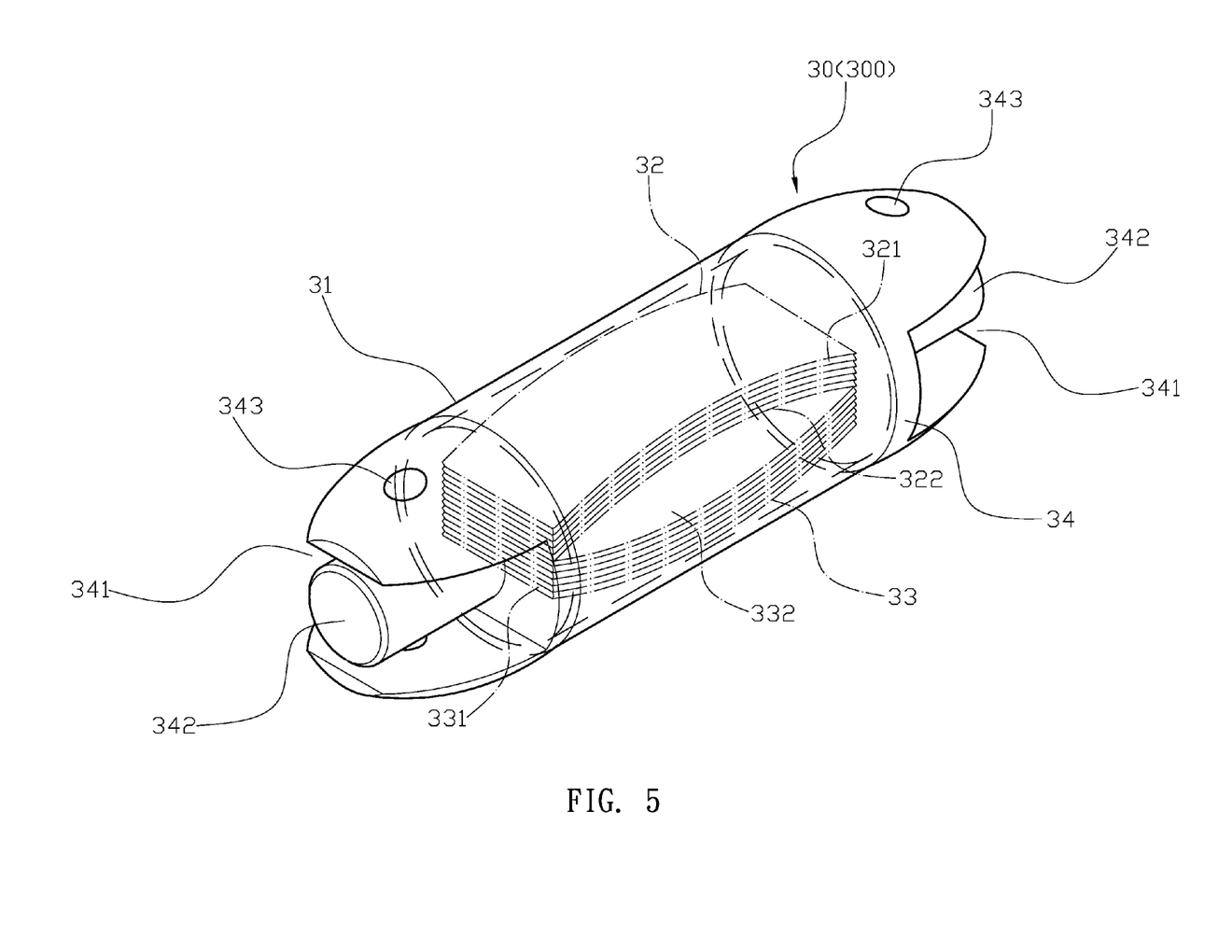
FIG. 5 is a perspective enlarged drawing of a rear suspension according to the embodiment of the present invention.

Please refer to FIG. 1 to FIG. 4. A bicycle 10 is mounted with at least a pair of front suspensions 20 and at least a pair of rear suspensions 30, 300. A support frame of the bicycle 10 has a front fork portion 11 and a rear fork portion 12, and an upper portion and a lower portion of the rear fork portion 12 are respectively discontinuous. A first rear upper fork section 13 and a second rear upper fork section 14 are separated on the upper portion and a first rear lower fork section 15 and the second rear lower fork section 16 are separated on the lower portion. An assembling space 17 is respectively formed between the separated first and second rear upper fork sections 13, 14 and the separated first and second rear lower fork sections 15, 16, and each assembling space 17 is respectively provided with one rear suspension 30, 300 such that the upper portion and the lower portion respectively form a supporting structure. The front fork portion 11, the first rear upper fork section 13, the second rear upper fork section 14, the first rear lower fork section 15 and the second rear lower fork section 16 all respectively have a securing aperture 18 at each of their ends. The front suspension 20 has a first solid damper 21 having a columnar shape, the first solid damper 21 has a plurality of overlapped elastic sheets 22, each elastic sheet 22 is made of metal and has a bent portion 221 at a middle section which provides elasticity. One end of the first solid damper 21 has a front fork end 23 for being pivoted onto a front wheel of the bicycle 10, and another end of the first solid damper 21 is provided with a first securing base 24 having a U-shaped socket 241. The socket 241 is provided with a protrusion portion 242, and the protrusion portion 242 and both sides of the first securing base 24 all correspondingly have a through aperture 243. The rear suspensions 30, 300 has a second solid damper 31 having a columnar shape, and the second solid damper 31 has a first elastic sheet set 32 and a second elastic sheet set 33. The first and second elastic sheet sets 32, 33 respectively comprise a plurality of overlapped elastic sheets 321, 331, and each elastic sheet 321, 331 is made of metal and has a bent portion 322, 332 at a middle section, which provides elasticity. Furthermore, the first elastic sheet set 32 and the second elastic sheet set 33 are arranged adjacent to each other. For example, as shown in FIG. 5, the concave surfaces of the first and second elastic sheets 32, 33 are arranged to face each other. Both ends of the second solid damper 31 are respectively provided with a second securing base 34 having a U-shaped socket 341. The socket 341 is provided with a protrusion portion 342, and the protrusion portion 342 and both sides of the second securing base 34 all correspondingly have a through aperture 343.

Figure 1:
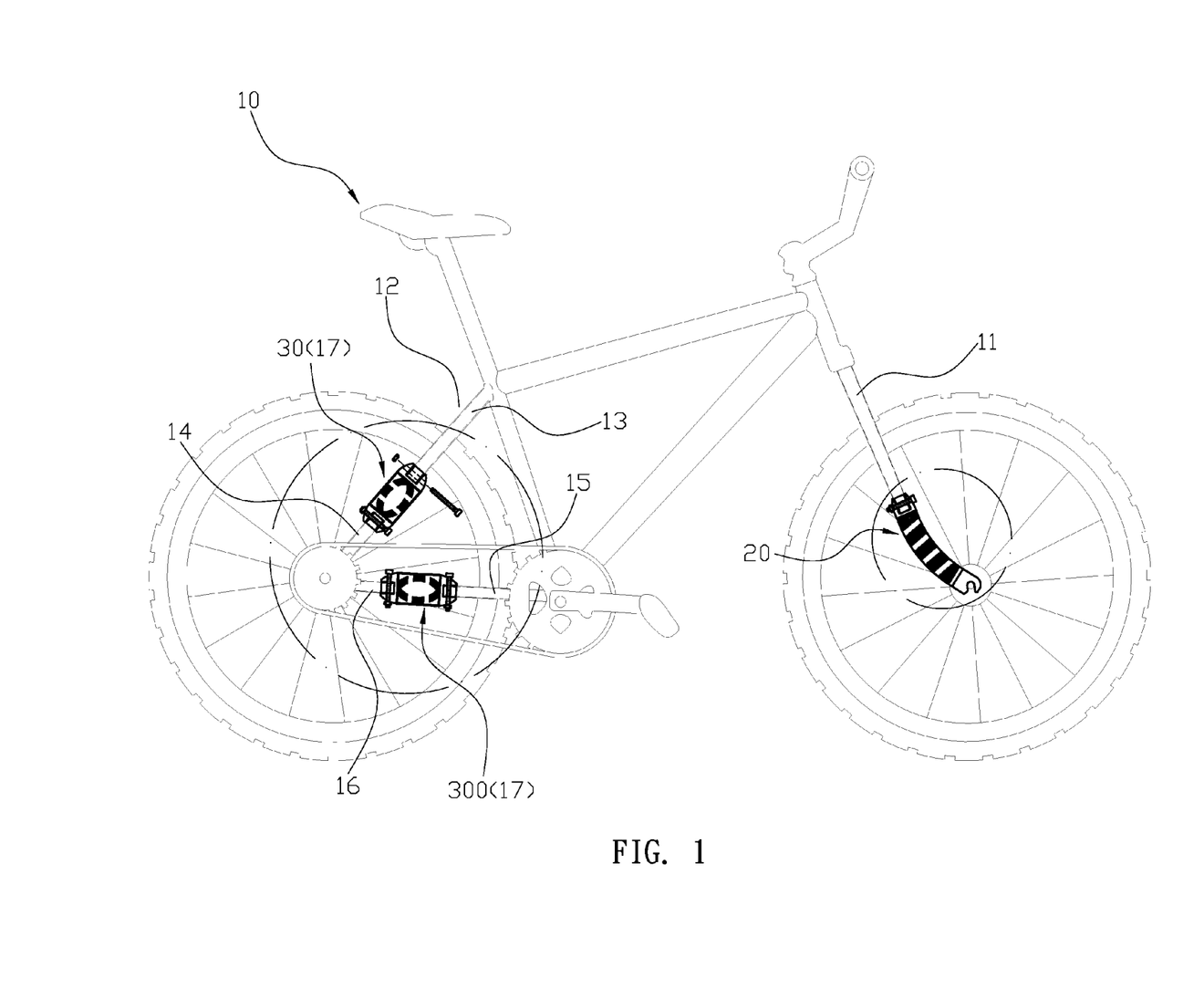
FIG. 1 is a schematic drawing of an embodiment of the present invention.
Figure 2:
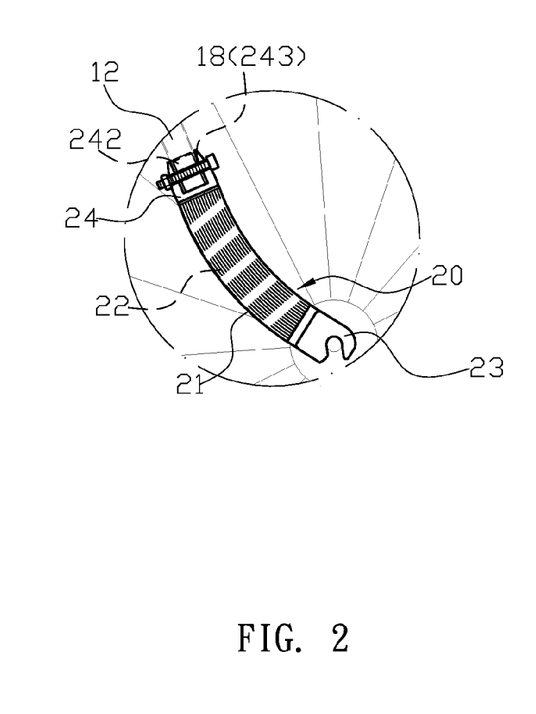
FIG. 2 is a local detail drawing of FIG. 1.
Figure 3:
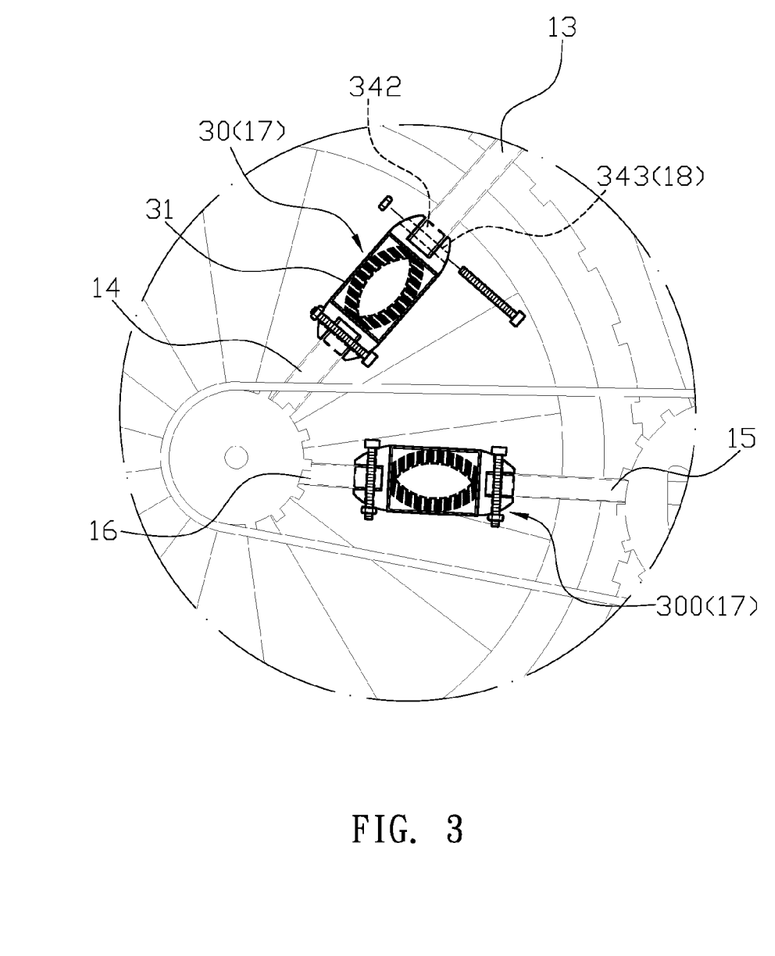
FIG. 3 is another local detail drawing of FIG. 1.
Figure 4:
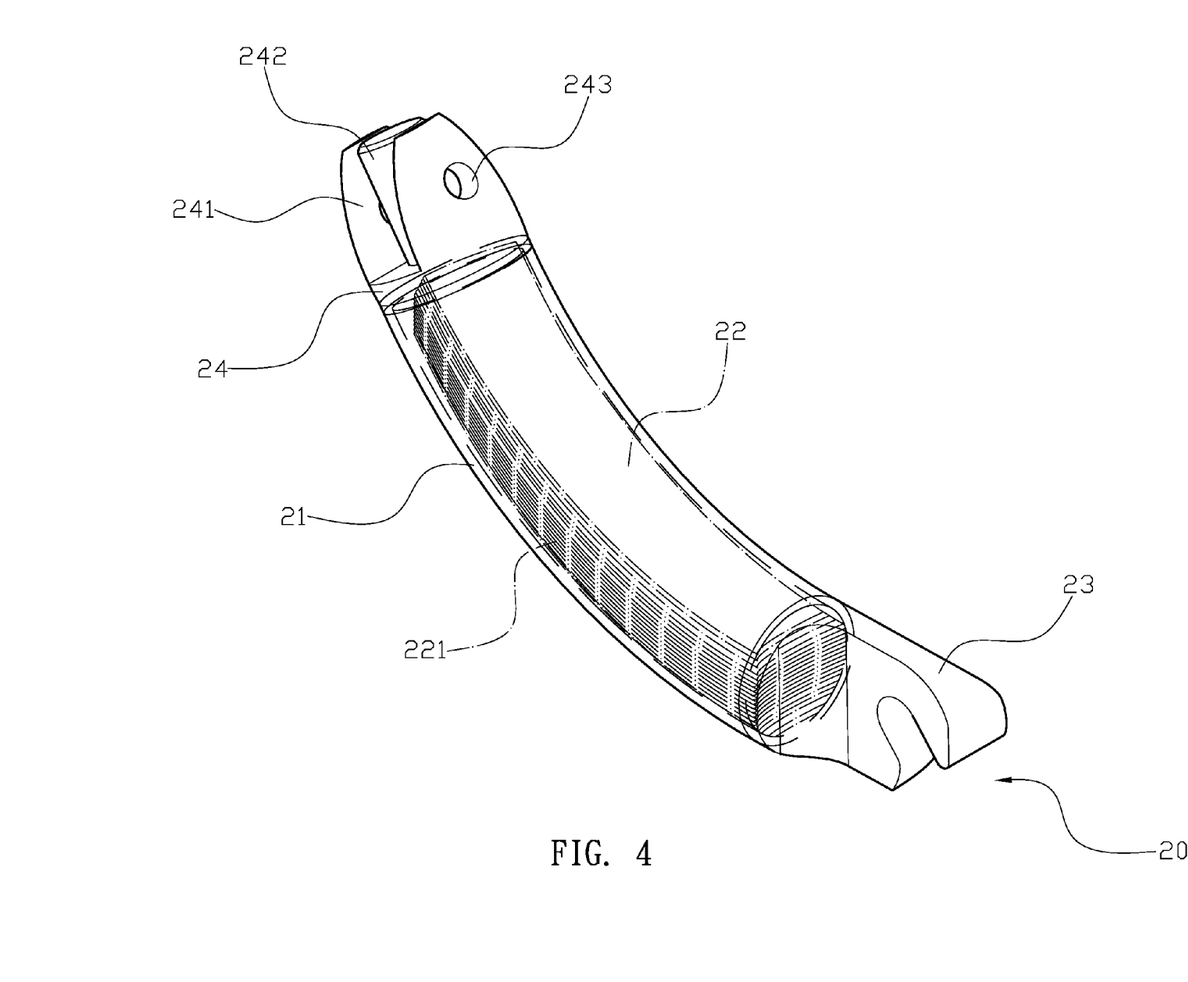
FIG. 4 is a perspective enlarged drawing of a front suspension according to the embodiment of the present invention.

For actual assembly, please refer to FIG. 1 to FIG. 3. The socket 241 of the front suspension 20 allows the first securing base 24 to mate with the front fork portion 11 of the bicycle 10, when a screw is tightened through the securing aperture 18 of the front fork portion 11 and the through apertures 243 of the front suspension 20, the front suspension 20 is securely positioned. Since the protrusion portion 242 is inserted into the front fork portion 11, it can prevent the front fork portion 11 from being deformed by forces applied onto the screws. The rear suspensions 30, 300 are respectively mounted at the assembling space 17 on the upper portion and the lower portion by respectively connecting the upper portion of the first and second rear upper fork sections 13, 14 and the lower portion of the first and second rear lower fork section 15, 16 together. When screws are respectively tightened through the securing apertures 18 of the first rear upper fork section 13, the second rear upper fork section 14, the first rear lower fork section 15, the second rear lower fork section 16 and the through apertures 343 of the rear suspensions 30, 300 together, the rear suspensions 30, 300 are securely positioned.

Figure 6:
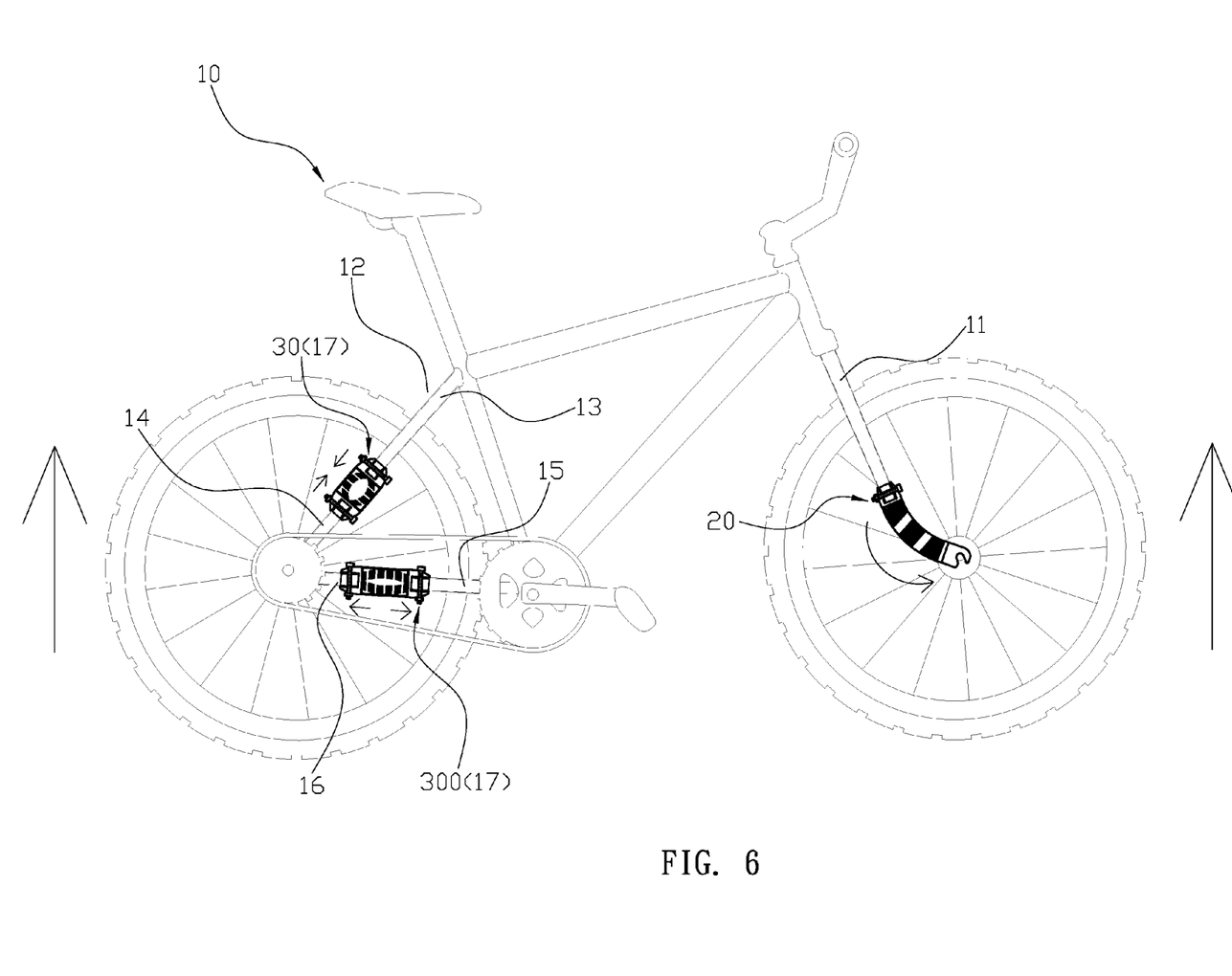
FIG. 6 is a status schematic drawing showing the suspensions absorbing upward vibration according to the embodiment of the present invention.
Figure 7:
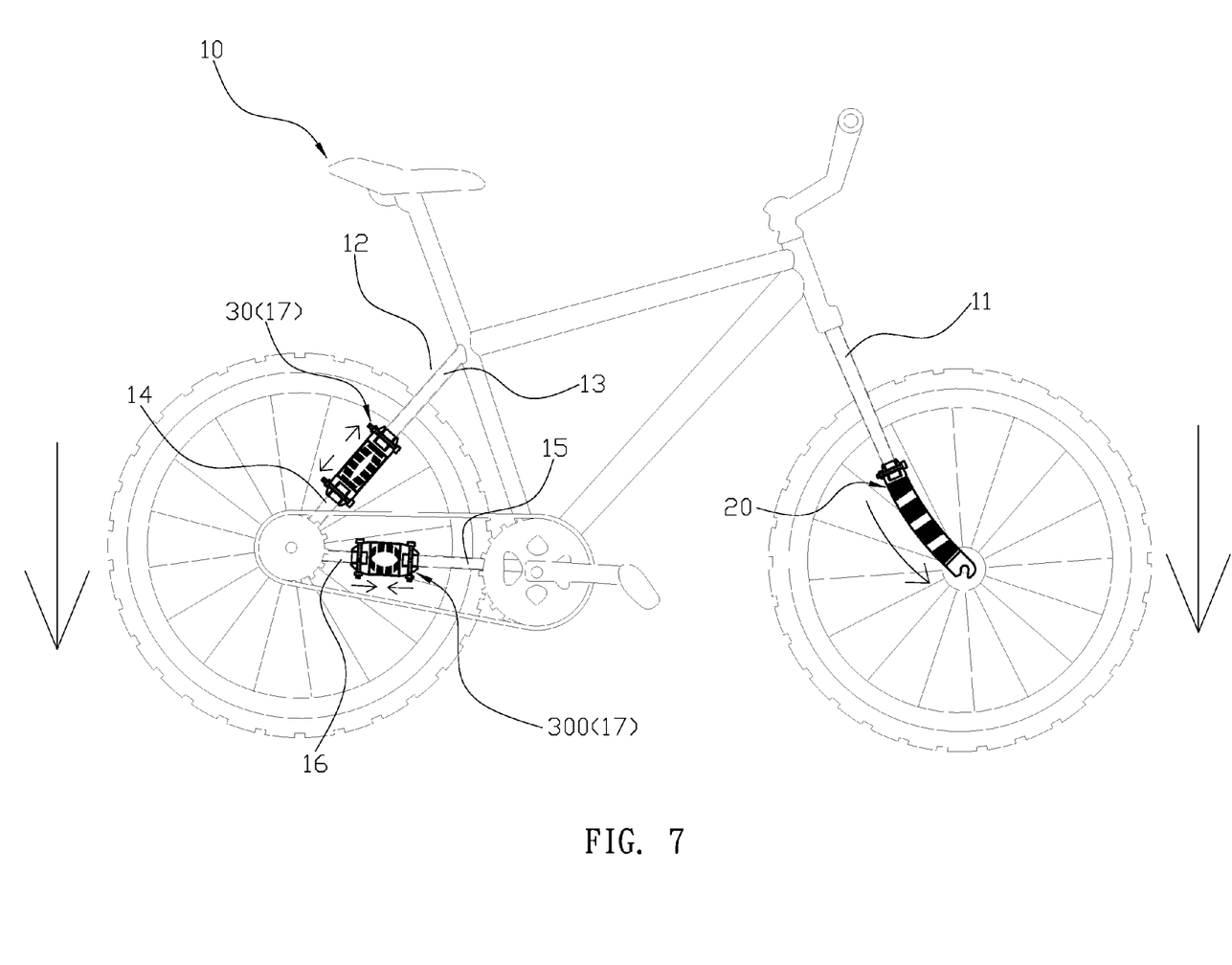
FIG. 7 is a status schematic drawing showing the suspensions absorbing downward vibration according to the embodiment of the present invention.

When a user rides the bicycle 10, if the rear wheel suffers from upward vibration, as shown in FIG. 6, the rear suspension 30 on the upper portion is compressed the first rear upper fork section 13 and the second rear upper fork section 14, which causes each elastic sheet 321, 331 in the rear suspension 30 to be bent more to absorb the vibration. Meanwhile, the rear suspension 300 on the lower portion is pull apart in two different direction by the first rear lower fork section 15 and the second rear lower fork section 16, which cause each elastic sheet 321, 331 in the rear suspension 300 to extend to absorb the vibration. Therefore, the entire support frame can maintain balance for more comfortable and safe ride. Alternatively, when the rear wheel suffers downward vibration, as shown in FIG. 7, the rear suspension 30 on the upper portion is expended and the rear suspension 300 on the lower portion is compressed, which also provides shock absorbing effect.

Please refer to FIG. 6 and FIG. 7 again. The vibration occurs on the front wheel can also be absorbed by compression or expending movement of the elastic sheet 22 in the front suspension 20.

Furthermore, the first and second solid dampers 21, 31 are made of PU plastic formed around the elastic sheets 2232, 1331 to prevent the elastic sheets from vibrating, and different PU plastic materials are used to provide correspondingly different elasticity and hardness to the first and second solid damper 21,31.

Figure 8:
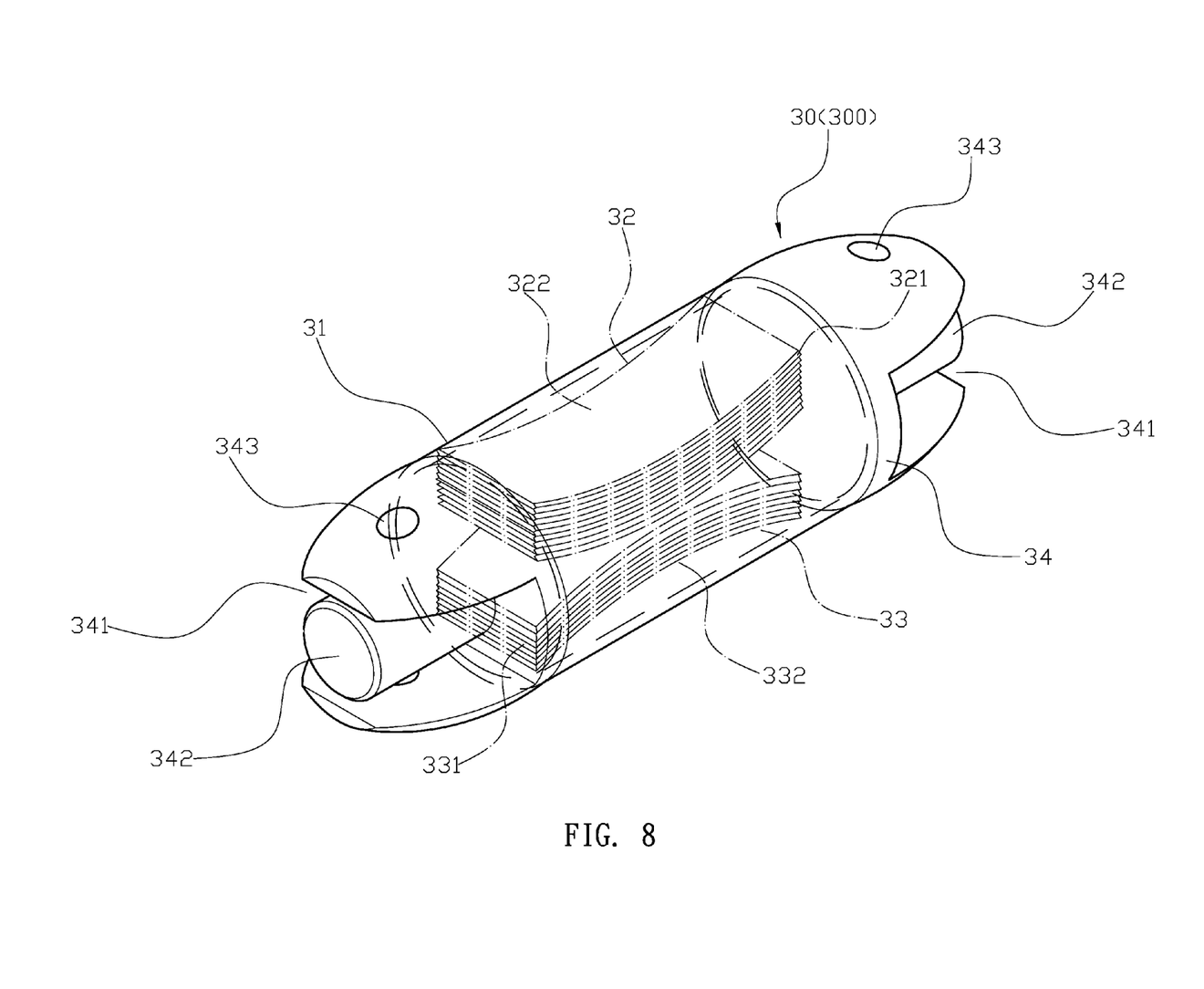
FIG. 8 is a schematic drawing of the rear damper according to another embodiment of the present invention.

Moreover, the number of the elastic sheets 2232, 1331 can be adjusted to satisfy different loads. According to the embodiment of the present invention, a plurality of elastic sheets 2232, 1331 are overlapped together to form a solid elastic sheet bundle such that the elastic sheets 2232, 1331 can only have up or down one direction deformation, and no movement under later stress. In addition, the bent portions 322, 332 of the first elastic sheet set 32 and the second elastic sheet set 33 of the rear suspensions 30, 300 are arranged with concave surfaces facing each other or convex surfaces facing each other, as shown in FIG. 5 or FIG. 8.

With above-mentioned structure, following benefits can be obtained: 1. The front suspension 20 and the rear suspensions 30, 300 have relative smaller dimensions and compatible with typical support frames, which is a plus for the design outlook of the bicycle. 2. The front suspension 20 and the rear suspensions 30, 300 have relative lighter weight, which overall provides minimum weight to the bicycle. 3. The front suspension 20 and the rear suspensions 30, 300 have relative simpler structure, which makes maintenance and repair much easier and lower cost. 4. The front suspension 20 and the rear suspensions 30, 300 require easy assembly; and by adjusting the number of the elastic sheets 2232, 1331, the damper can provide different elasticity. 5. The suspensions are directly mounted next to the front and rear wheels, therefore, the relative positions among the handles, seat, peddles and the support frame remain the same.

Although the present invention has been explained in relation to its preferred embodiment, it is to be understood that many other possible modifications and variations can be made without departing from the spirit and scope of the invention as hereinafter claimed.

What is claimed is:

1. A bicycle having shock absorbers comprising: at least a pair of front suspensions and at least a pair of rear suspensions; wherein:
   a support frame of the bicycle has a front fork portion and a rear fork portion, an upper portion and a lower portion of the rear fork portion are respectively discontinuous, a first rear upper fork section and a second rear upper fork section are separated on the upper portion and a first rear lower fork section and a second rear lower fork section are separated on the lower portion, an assembling space is respectively formed between the separated first and second rear upper fork sections and the separated first and second rear lower fork sections and each assembling space is respectively provided with one rear suspension, such that the upper portion and the lower portion respectively form a supporting structure;
   each front suspension has a first solid damper having a columnar shape, the solid damper having a plurality of overlapped elastic sheets, each elastic sheet made of metal and having a bent portion at a middle section which provides elasticity; and one end of the solid damper has a front fork end and another end is provided with a first securing base;
   each rear suspension has a second solid damper having a columnar shape, the second solid damper having a first elastic sheet set and a second elastic sheet set; wherein the first and second elastic sheet sets respectively comprise a plurality of overlapped elastic sheets, each elastic sheet made of metal and having a bent portion at a middle section which provides elasticity; and wherein the first elastic sheet set and the second elastic sheet set are arranged adjacent to each other; and opposing ends of the second solid damper are respectively provided with a second securing base.

2. The bicycle having shock absorbers of claim 1, wherein the front fork portion, the first rear upper fork section, the second rear upper fork section, the first rear lower fork section and the second rear lower fork section all respectively have a securing aperture at each of their ends, the first and second securing bases of the front and rear suspension all respectively have a U-shaped socket, and a through aperture is respectively provided on opposing sides of the socket, such that the front and rear suspension are capable of being mounted onto the front fork portion, the first rear upper fork section, the second rear upper fork section, the first rear lower fork section and the second rear lower fork section by securing the securing apertures and through apertures with screws.

3. The bicycle having shock absorbers of claim 2, wherein the socket of each of the front and rear suspensions is provided with a protruding portion having a through aperture; wherein the respective protruding portion is inserted into the front fork portion, the first rear upper fork section, the second rear upper fork section, the first rear lower fork section and the second rear lower fork section to provide support and to prevent the front fork portion, the first rear upper fork section, the second rear upper fork section, the first rear lower fork section and the second rear lower fork section from being deformed by forces applied onto the screws.

4. The bicycle having shock absorbers of claim 1, wherein each elastic sheet of the front and rear suspensions is formed from stamped spring steel.

5. The bicycle having shock absorbers of claim 1, wherein the first elastic sheet set and the second elastic sheet set of the rear suspension are arranged with concave surfaces facing each other.

6. The bicycle having shock absorbers of claim 1, wherein the first elastic sheet set and the second elastic sheet set of the rear suspension are arranged with convex surfaces facing each other.

7. The bicycle having shock absorbers of claim 1, wherein the solid damper of the front and rear suspensions includes PU plastic formed around the elastic sheets to prevent the elastic sheets from vibrating.

8. The bicycle having shock absorbers of claim 7, wherein different PU plastic materials are used to provide correspondingly different damper elasticity and hardness.

9. The bicycle having shock absorbers of claim 1, wherein the number of elastic sheets in the front and rear suspensions is adjustable.

* * * * *